F. H. GERDEMAN.
TRACTOR CONTROL.
APPLICATION FILED JAN. 17, 1920.

1,390,287.

Patented Sept. 13, 1921.
5 SHEETS—SHEET 1.

INVENTOR
Frank H. Gerdeman,
By Owen Owen & Crampton,
His attys.

UNITED STATES PATENT OFFICE.

FRANK H. GERDEMAN, OF FINDLAY, OHIO.

TRACTOR CONTROL.

1,390,287.  Specification of Letters Patent.  Patented Sept. 13, 1921.

Application filed January 17, 1920. Serial No. 352,145.

*To all whom it may concern:*

Be it known that I, FRANK H. GERDEMAN, a citizen of the United States, and a resident of Findlay, in the county of Hancock and State of Ohio, have invented a certain new and useful Tractor Control; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to control means for tractors, and has for its primary object the provision of a simple and improved control for the steering means of a tractor, the provision of a simple and improved control for the driving means of a tractor, and the provision of a simple and efficient unitary control for both the steering and driving means of a tractor, whereby to enhance the practicability and commercial value and ease of operation of apparatus of this character.

The invention is fully described in the following specification, and while in its broader aspect it is capable of embodiment in numerous forms, a preferred embodiment thereof in illustrated in the accompanying drawings, in which.

Figure 1:
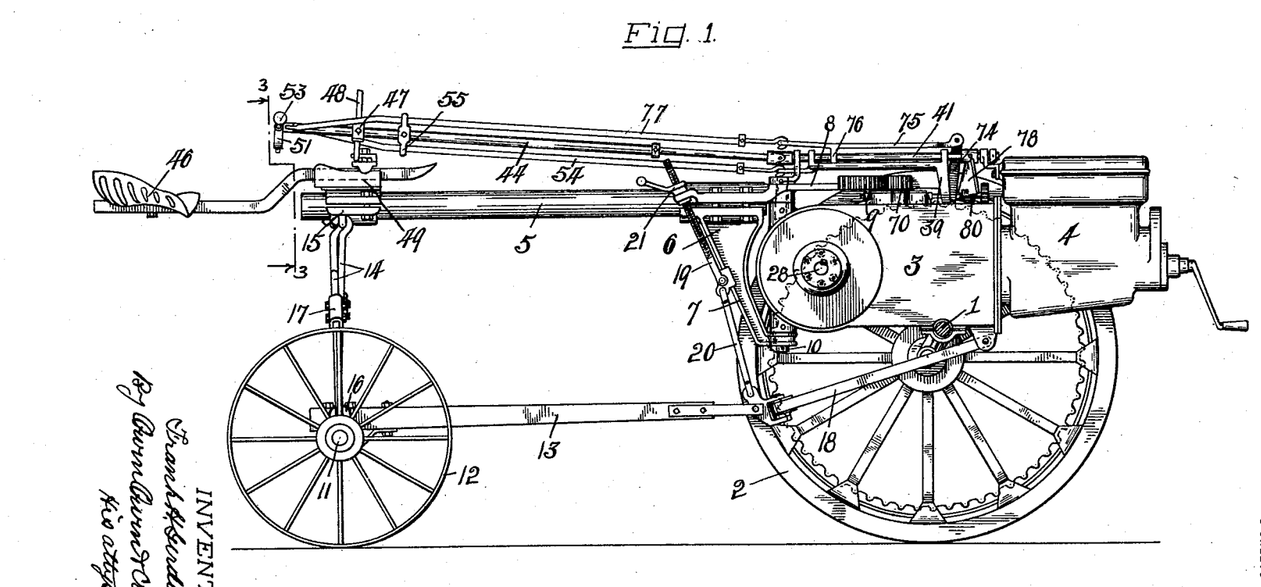
Figure 1 is a side elevation of an apparatus embodying the invention, with a portion of the tractor in section.

Referring to the drawings, 1 designates the tractor axle which carries the drive wheels 2, 2 at its ends and the casing or frame 3 intermediate its ends. A motor 4 is carried by the casing at its forward end and a draft-beam 5 projects from the upper rear end portion of the casing for horizontal pivotal trailing movements relative thereto. The draft-beam 5, in the present instance, is of tubular form and is connected to the casing 3 through the medium of a yoke 6, which has a lower arm 7 extending downward at the rear of the casing and under the same and an upper arm 8 extending forward over the rear end of the casing and terminating in a segmental rack 9. The yoke arms 7 and 8 are pivoted in coaxial alinement to the rear end of the casing 3 as noted particularly in Fig. 1, the pivot studs for the arms being designated 10.

The apparatus to be drawn by the tractor and which coacts with the draft-beam to maintain the tractor frame or casing in proper position, is illustrated, in the present instance, by a truck, which comprises the axle 11, wheels 12 at the ends thereof, and tongue 13 projecting forwardly from the axle centrally thereof.

The rear end of the draft-beam 5 is supported in proper position above the truck or other attached apparatus, in the present instance, by a pair of rods 14, which are pivotally connected at their lower ends to the axle 11 at respective sides of the tongue 13 and adjacent to the wheels 12, and have their upper ends crossing each other below the draft-beam and pivotally connected to the respective ends of a cross-arm 15, which is mounted for vertical turning movements on the rear end of the beam 4. The lower ends of the supporting rods 14 are preferably detachably hooked within eyes or loops provided on the top portions of collars or clips 16 mounted on the axle 11 and the upper ends of the rods are hooked preferably in a detachable manner through eyes provided in the end portions of the cross-arm 15, thus adapting the rods for both longitudinal and transverse swinging or pivotal movements, relative to the beam. Each rod 14, in the present instance, comprises two sections clamped together by clamps 17 to facilitate a longitudinal adjustment to lengthen or shorten the rods to suit the height at which it is desired to support the draft-beam above the supporting means to which attached.

The tongue 13 is pivotally connected at its forward end by a yoke 18 to the under side of the casing 3 and the rear end of this yoke is adjustably suspended from the yoke 6 by links 19 and 20, the upper of which projects through a part of the yoke and is threaded to receive an adjusting nut 21. The draft appliance comprising the connection between the tractor and the truck or other device to which attached, forms no part of the present invention and need not therefore be more specifically described.

The crank shaft 25 of the motor 4 extends rearwardly into the casing 3 and is adapted to communicate forward or reverse rotation to the large or ring gear 26 of a differential unit 27 that is mounted on a split jack shaft 28, mounted in the rear end portion of the casing 3 crosswise thereof and having its outer ends in suitable driving connection with the tractor wheels 2, as well understood in the art.

The present embodiment of the transmission mechanism between the motor shaft 25 and differential unit comprises the two axially alined relatively rotatable shaft sections 29 and 29′ in axial alinement with the rear end of the shaft 25 and with the shaft section 29′ having its forward end journaled in a socket in the adjacent end of the shaft section 29. A beveled pinion 30 is fixed to the rear end of the shaft section 29′ and is in driving mesh with the differential gear 26. A slide gear 31 is feathered on the shaft section 29′ and is movable into clutch engagement with the adjacent end of the motor shaft section 29 to adapt the shaft section 29′ to be directly driven by the motor shaft during a forward driving of the tractor. The shaft section 29 has a pinion 32 at its rear end in driving connection, through a pinion not shown with a pinion 33 mounted on a shaft 34 within the gear case 35 at one side of the shaft section 29′, whereby the pinion 33 is driven in the same direction as the pinion 32. A pinion 36 is also mounted on the shaft 34 in connection with the pinion 33 so that they are driven together, and the pinion 31 is adapted, when shifted rearwardly from neutral position, to be engaged with the pinion 36 so that a reverse drive is then communicated to the shaft section 29′ from the shaft section 29 due to the meshing of the gears 32 and 33, as is apparent. The shift arm 37 for the pinion 31 is carried by a rod 38 that is mounted in a part of the gear case 35 for movements longitudinally of the motor shaft. The forward end of the rod 38 is connected to an arm 39 that extends upward through a slot 40 in the casing 3 and has its upper end rearwardly angled and slidingly supported at spaced points thereon by a shaft 41, which is journaled adjacent to its forward and rear ends in brackets 42 and 43.

Figure 3:
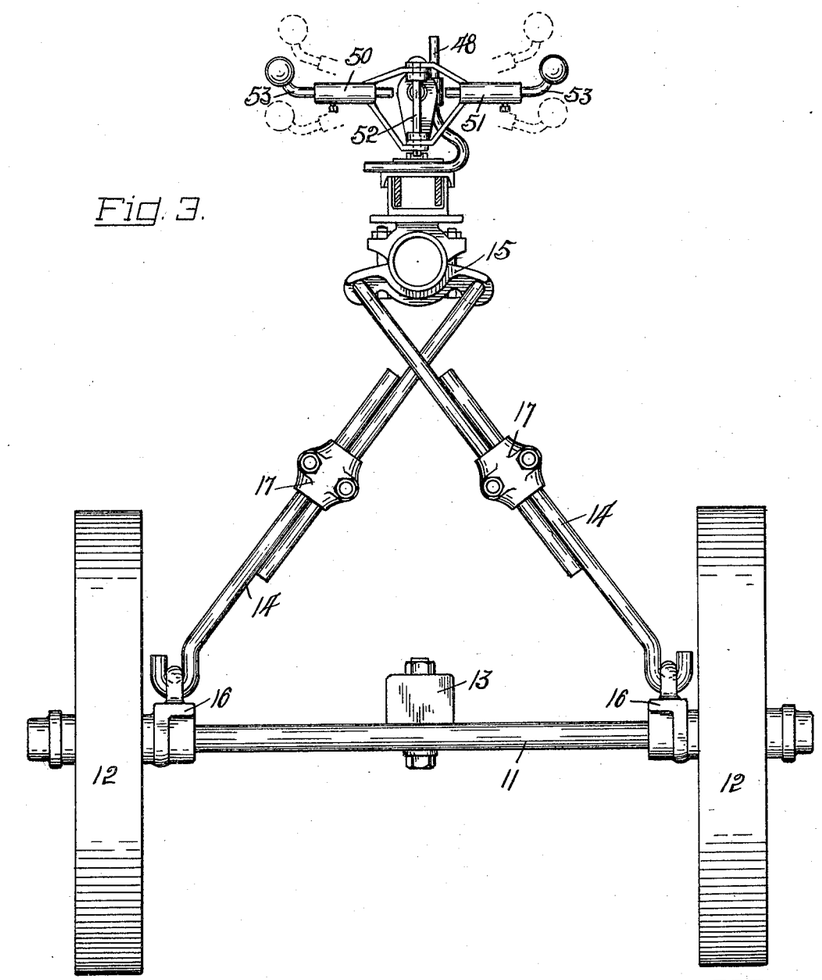
Fig. 3 is an enlarged rear view thereof with a part in section on the line 3—3 in Fig. 1.

The shaft 41 comprises a part of the steering control mechanism, as hereinafter more fully described, and has a shaft 44 pivoted to its rear end, as at 45, and extending rearwardly therefrom lengthwise of the draft-beam 5 over the top thereof of a point near the driver's seat 46, which, in the present instance, is supported by and projects rearwardly from the rear end of the beam 5. The shaft section 44 is journaled near its rear end in a bearing block 47 which is carried for vertical adjustment by a standard 48 rising from the seat clamping means 49 on the draft-beam 5, thus adapting the rear end of the shaft section 44 to be vertically adjusted to suit the operator. Arms 50 and 51 pivotally project in opposite directions substantially in a horizontal plane from the rear end of a shaft section 44 crosswise thereof, being connected thereto, in the present instance, by a common bolt or pivot-pin 52, as best shown in Fig. 3, thus enabling the two handles to be rocked relative to each other and to the shaft section longitudinally of the latter and also to be rocked in unison in a vertical plane and communicate a corresponding rocking movement to the shaft section 44 and the shaft 41 to which attached. Each arm 50 and 51, in the present instance, is of tubular form and has a handle 53 adjustably projecting therefrom.

The slide arm 39 is connected at its rear end by a rod or member 54 to one of the arms 50 and 51, the former, in the present instance, so that a horizontal rocking movement of such arm will communicate a corresponding shifting movement to the arm 39 to throw the pinion 31 in either direction from neutral position to effect a forward or reverse driving of the tractor. The rod or member 54 extends rearward under the shaft section 44 through a guide 55 carried by the shaft 44 and thence angles outwardly from the shaft and pivotally connects at its rear end to the handle 50 near its outer end.

Figure 6:
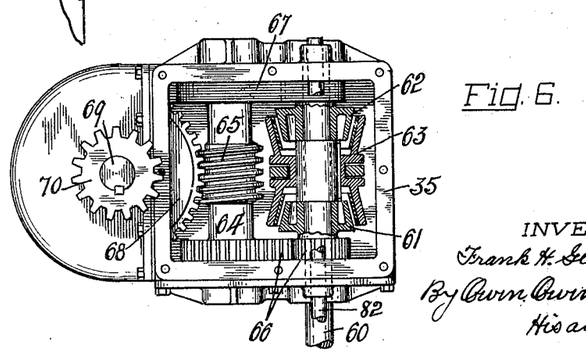
Fig. 6 is an enlarged plan of a portion of the steering mechanism with the cover of the inclosing case removed and the parts broken away.

The motor shaft section 29 has a conical clutch member 56 feathered thereto and shiftable into and out of engagement with a companion clutch member 57 forming a flywheel and fixedly mounted on the motor shaft 25 and a gear 58 fixed to its outer side. The gear 58 meshes with a gear 59 mounted on a counter-shaft 60 journaled in the upper portion of the casing 3 and gear-casing 35 lengthwise of the former. The shaft 60 loosely carries a pair of axially spaced conical clutch members 61 and 62 within the gear case 35, and has a double conical clutch member 63 feathered thereon intermediate the clutch members 61 and 62 to adapt it to be placed in clutch engagement with either of said members or in neutral relation thereto. (See Figs. 4 and 6). A shaft 64 carrying a worm 65 is journaled in the gear case at one side of the shaft 60 and is connected at one end with the clutch member 61 through a pair of gears 66 and is connected at its other end to the clutch member 62 by a chain and sprocket connection 67, or in any other suitable manner, thus adapting the worm-shaft to be driven in one direction or the other depending on which clutch member is in driving connection with the shaft 60. The worm 65 meshes with and drives a worm-wheel 68 mounted on a shaft 69 within the gear case 35, said shaft being vertically disposed and having its upper end extending through a top of the gear case and provided with a pinion 70 in mesh with the segmental rack 9 on the forward end of the draft-beam 5. It is thus evident that a horizontal turning of the tractor relative to the draft beam may be effected in the desired direction by a shifting of the clutch member 63 into engagement with the proper clutch member 61, 62 of the steering mechanism.

The clutch member 56 on the motor shaft section 29 is normally urged into yielding engagement with its companion by the action of a coiled compression spring 71 on the shaft section 29, and the clutch member 56 is withdrawn from engagement with its companion by the movement of a forked shipper-arm 72, which engages a peripheral hub recess in the clutch member and is mounted for transverse movements on the shaft 73, journaled in the casing 3. A control arm 74 is fixed to and rises from the rock shaft 73, extending up through the slot or opening 40 in the top of the casing 3 and having its upper end pivoted to a transversely extending member 75 that extends rearwardly over the shaft 41 and has a side lug or extension 76 sliding on said shaft. The rear end of the member 75 is connected by a rod or member 77 to the control arm 51 so that horizontal rocking movements of such arm will impart corresponding rocking movements to the arms 74 and 72. The member 77 extends rearwardly over the shaft section 44 through a guide eye in the upper end of the member 55 and thence angles laterally to the point where it connects with the arm 51.

It is evident that the shaft 60 is continuously driven from the motor shaft 25 when the motor is running, and that the shaft section 29 is normally driven by the motor shaft when running due to the normal engagement of the clutch members 56 and 57.

Figure 2:
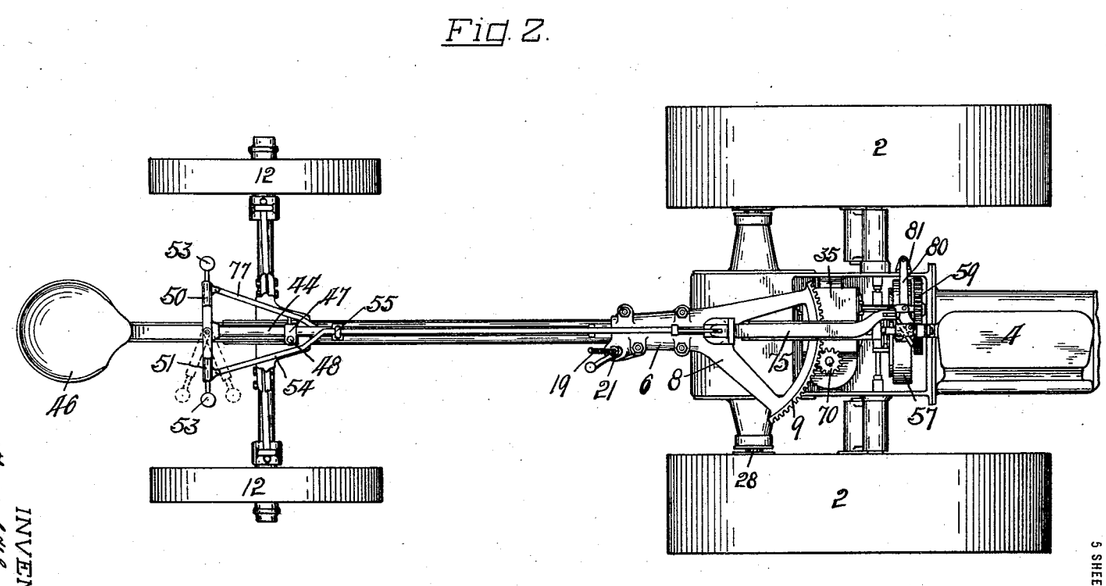
Fig. 2 is a top plan view thereof.
Figure 4:
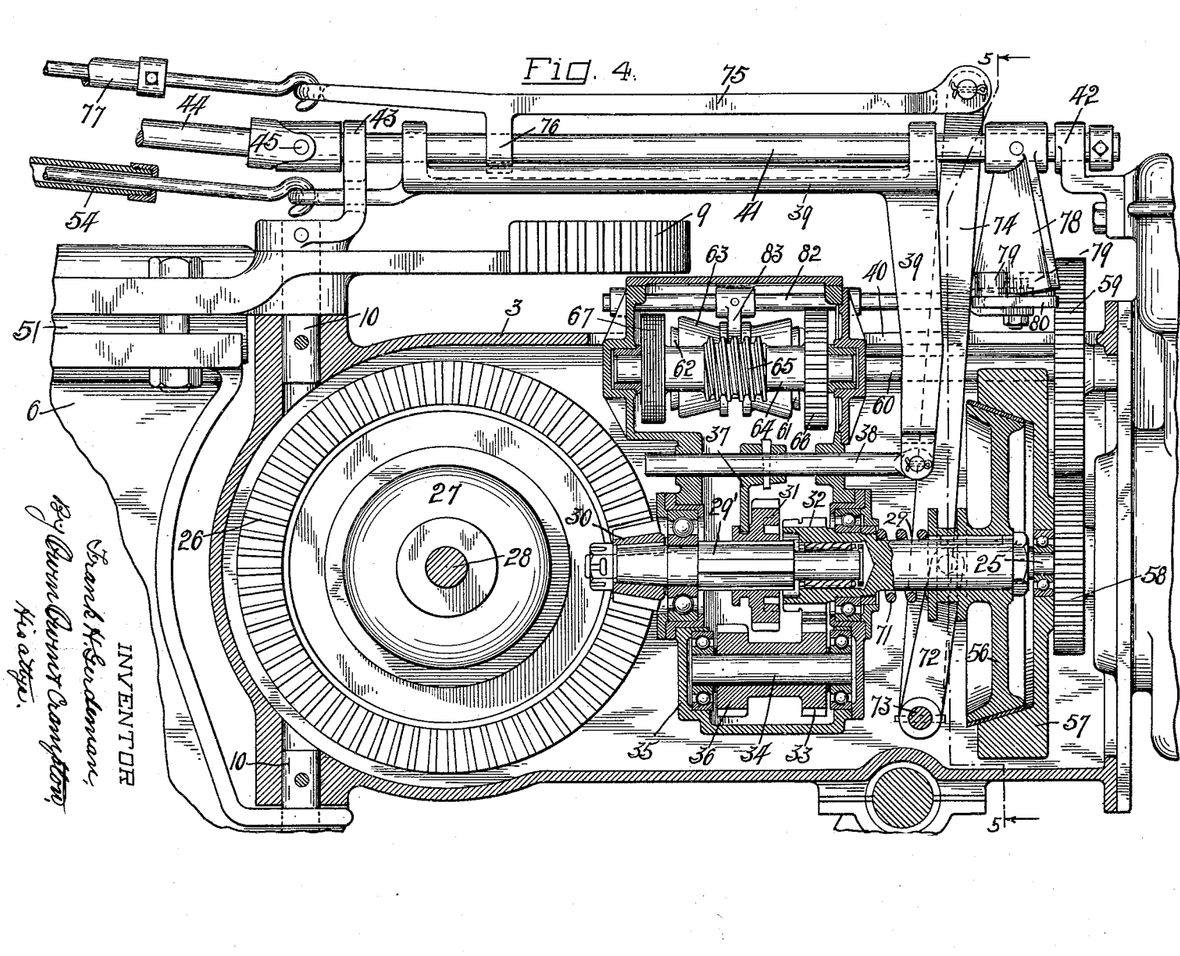
Fig. 4 is an enlarged section of the power transmission and steering means taken on the line 4—4 in Fig. 5.
Figure 5:
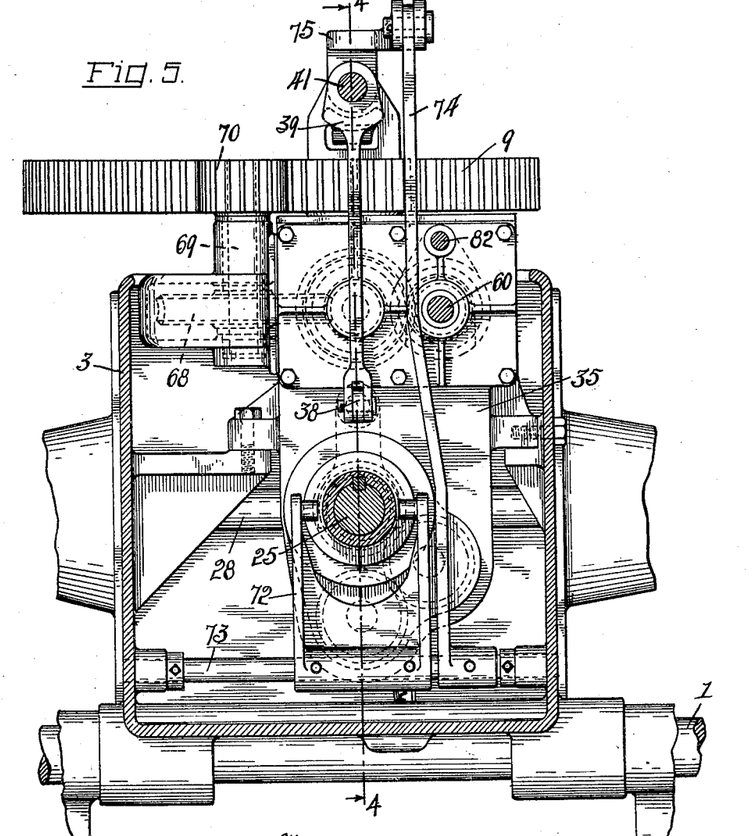
Fig. 5 is an enlarged section taken on the line 5—5 in Fig. 4, with parts broken away.

The shaft 41 has a blade-like arm or wing 78 projecting downward from its forward end portion, said member having its lower or free end disposed in diagonal relation to the shaft 41 and working between a pair of opposed rollers 79 carried at the free end of a swinging arm 80 (Figs. 2 and 4). The arm 80 projects horizontally over the forward end portion of the casing 3 transversely thereof and has its outer end pivoted to a bracket 81 rising from a side of said casing. It is thus evident that a rocking of the shaft 41 will cause its wing 78 to have a camming action on the rollers 79 and to effect a consequent rocking of the arm 80 either rearward or forward depending on the direction of rocking of the shaft 41. A shipper-rod 82 for the clutch member 63 is mounted in the gear casing 35 for longitudinal movements in parallelism with the shaft 60 and has its forward end pivotally connected to the arm 80. A forked arm 83 projects from the rod 82 within the gear case and engages a peripheral recess in the clutch member 63. It is evident that a rocking of the shaft 41 in clock-wise direction will impart a forward movement to the arm 80 and shipper-rod 82 and effect an engaging of the clutch member 63 with the companion clutch member 61 of the steering mechanism, and that a rocking of the shaft 41 in counter-clockwise direction will impart a rearward movement to the arm 80 and shipper-rod 82 and cause an engagement of the clutch member 63 with the clutch member 62 of the steering mechanism so that the direction of driving of the pinion 70 in engagement with the segmental rack 9 depends on the direction of rocking of the steering shaft 41.

The control members 44, 54 and 77 of the steering and driving control mechanisms are preferably of sectional telescoped form to facilitate longitudinal adjustment thereof so that the position of the control handles 50 and 51 may be adjusted toward or away from the driver's seat 46 to suit the operator. The members 44, 54 and 77 also have free pivotal connection with the respective members 41, 39 and 75 to which attached, with each connection in substantially vertical alinement with the steering axis 10 of the tractor to permit the control parts to accommodate themselves to the relative wrenching movements of the tractor and draft-beam, which occur when the apparatus is traveling over uneven ground, as is well understood in the art.

In the operation of my improved control, the operator, when desiring to turn the tractor in one direction or the other from the line of travel, turns the handles 50 and 51 vertically in counterclockwise direction, if it is desired to turn the tractor to the left, and in clockwise direction, if it is desired to turn the tractor to the right. This turning movement of the control handles is communicated to the shaft 41 through the connecting member 44 thereby rocking the cam wing 78 and effecting a forward movement of the shipper-rod 82, when the shaft 41 is turned to the right or in clockwise direction, and a rearward movement to said rod when the shaft is turned to the left or in counter-clockwise direction, thereby moving the clutch member 63 into engagement with one or the other of the companion clutch members 61 and 62 to drive the worm 65 in one direction or the other. The rotation of the worm 65 is communicated to the segmental rack 9 through the worm wheel 68, shaft 69, and pinion 70, thereby effecting a horizontal turning of the tractor in one direction or the other relative to the draft beam 5 pivoted thereto. It will be understood that the shaft 60 of the steering control mechanism is continuously driven when the motor of the tractor is running due to the gear connection between the motor shaft 25 and the shaft 60. The shaft section 29 is normally driven through the clutch connection 56 and 57 with the motor shaft, and when it is desired to disconnect the motor shaft and shaft section 29, the operator moves the control handle 51 to the rear thereby communicating a rearward clutch releasing movement to the arms 72 and 74 through the medium of the connecting members 77 and 75. The forward and reverse running of the tractor is controlled by forward and rearward movements of the control handle 50, as a forward movement of such handle moves the members 54 and 39 forward and effects a shifting of the pinion 31 into clutch engagement with the end of the drive or motor shaft 25, thereby causing a direct forward driving of the ring gear 26 of the differential mechanism 27 from the motor shaft. For reverse driving the operator moves the control handle 50 to the rear thereby effecting a rearward shifting of the pinion 31 to place it in engagement with the pinion 36 so that the motor shaft section 29 is then driven in reverse direction to that of the motor shaft 25 through the medium of the pinions 32, 33, 36 and 31. When the control handle 50 is in neutral position, or at right angles to the member 44, as shown in full lines in Fig. 2, the pinion 31 of the transmission gearing is in its neutral position, as shown in Fig. 4.

It is evident that I have provided a simple and efficient unitary control for the steering and driving mechanisms of a tractor, which may be rotated about the axis of the member 44 to effect the desired steering of the tractor, and which has independent control handles capable of relative forward and rearward rocking movements, one to control the clutch member 56 and the other to control the forward or reverse driving of the tractor. It is also evident that my control means is adjustable to suit the operator and is capable of sufficient flexibility relative to the tractor to accommodate or allow for the relative transverse wrenching movements of the tractor and trailing truck of the apparatus when operated over rough or uneven surfaces.

I wish it understood that my invention is not limited to any specific construction, arrangement or form of the parts as it is capable of numerous modifications and changes without departing from the spirit of the claims.

Having thus described my invention what I claim as new and desire to secure by Letters Patent, is,—

1. In a tractor, a steering mechanism having a clutch member shiftable in one direction or another from neutral position to effect an operation of the mechanism to turn the truck in one direction or another, a rotatable control having a rocking cam wing, and means connecting said cam wing and clutch member to impart predetermined shifting movements to the latter when the wing is rocked in one direction or the other.

2. In a tractor, a trailing apparatus connected for horizontal pivotal movements to the tractor and having a segmental rack member concentric to its pivot, steering mechanism carried by the tractor and driven by its motor and having driving connection with said rack, a control for said mechanism shiftable from neutral position to effect a driving of the segmental rack in one direction or the other, and vertically rocking operating means having a cam wing in co-action with said control means and operable when rocked in one direction or the other to impart a predetermined movement to the control means.

3. In a tractor, a steering mechanism having a control clutch movable in one direction or the other from neutral position to cause a turning in one direction or the other of the tractor, and rotatable control means having a cam wing operable when rocked in one direction or the other to impart a movement in one direction or the other to said clutch member from neutral position.

4. In a tractor, a motor, a transmission mechanism, a steering mechanism in connection with and driven by said motor and having a clutch member movable in one direction or the other from neutral position to effect a turning of the tractor in either of opposite directions, a second clutch interposed between the motor and transmission mechanism, and control means connected to both of said clutches and independently operable to move either clutch.

5. In a tractor, a motor, a transmission mechanism, a steering mechanism in connection with and driven by said motor and having a clutch member movable in one direction or the other from neutral position to effect a turning of the tractor in either of opposite directions, a second clutch interposed between the motor and transmission mechanism, and control means having a control member rotatable about one axis to control the movement of the first clutch and movable about a different axis to control the movements of the second clutch.

6. In a tractor, a motor, a transmission mechanism, a steering mechanism in connection with and driven by said motor and having a clutch member movable in one direction or the other from neutral position to effect a turning of the tractor in either of opposite directions, a second clutch interposed between the motor and transmission mechanism, a vertically rocking member having a transversely projecting cam wing, means connecting the cam wing and first clutch member to communicate predetermined shifting movements to the member when the cam wing is rocked in one direction or the other, shipper means for the second clutch and a common control handle connected to both said rocking member and shipper means and independently operable to rock the member and to impart predetermined shifting movements to the shipper means.

7. In a tractor, a motor, a transmission mechanism, a steering mechanism in connection with and driven by said motor and having a clutch member movable in one direction or the other from neutral position to effect a turning of the tractor in either of opposite directions, a second clutch interposed between the motor and transmission mechanism, shipper means for said first clutch member and having a rocking member, shipper means connected to the second clutch member, and a common control element pivoted to the rocking member of the first shipper means for rocking movements longitudinally thereof and connected to the second shipper means, said control element being rotatable with the rocking member to control the shifting of the first clutch member and being movable on its pivot relative to the rocking member to control the shifting movements of the second clutch.

8. In a tractor, a motor, a transmission mechanism, a pivotally trailing apparatus having a segmental steering rack, a steering mechanism carried by the tractor in driven connection with the motor and having a pinion in driving connection with said rack, said mechanism having a clutch movable from neutral position to effect a driving of the pinion in either of opposite directions, a shipper member for the clutch having transversely spaced parts, a rocker member having a cam wing movable between the parts of said shipper member to move the latter in either of opposite directions when the rocker member is rocked, a control handle pivoted to said rocker member for rocking movements lengthwise thereof, clutch means between the motor and transmission mechanism, and means connecting said clutch means and control handle to impart predetermined movements to the former when the latter is rocked relative to said rocker member.

9. In a tractor, a motor, a forward and reverse tractor driving means connected to the motor and having an element shiftable from neutral into forward and reverse running positions, shifting means for the element, a steering mechanism for the tractor having a rotatable operating member, and a common control element carried by the member and rockable in one direction with the member to operate the same to control the steering mechanism and rockable relative to said member longitudinally thereof to control the movements of the shifting means.

10. In a tractor, a motor, a power transmission mechanism driven by the motor and having an element shiftable from neutral for forward or reverse driving, a steering mechanism driven by the motor and having an element shiftable from neutral to cause a steering of the tractor in one direction or the other, respective control means for said mechanisms, and a unitary control member for said control means movable in one plane to effect an operation of one member and in another plane to effect an operation of the other mechanism.

11. In a tractor, a motor, a power transmission mechanism driven by the motor and having an element shiftable from neutral for forward or reverse running, a steering mechanism driven by the motor and having an element shiftable from neutral to effect a steering of the tractor in one direction or the other, means operable to shift the steering mechanism element and having a vertically rotatable member, means operable to shift the transmission mechanism element and having a member adjacent to and moving lengthwise of the said rotatable member, and control means connected to both said members and having a control element movable in one plane to effect a rocking of the rotatable member and movable in a different plane to effect a reciprocation of the other member lengthwise of the rocking member.

12. In a tractor, a motor, a power transmission mechanism driven by the motor and having an element shiftable from neutral for forward or reverse running, a steering mechanism driven by the motor and having an element shiftable from neutral to effect a steering of the tractor in one direction or the other, means operable to shift the steering mechanism element and having a vertically rotatable member, means operable to shift the transmission mechanism element and having a member adjacent to and movable lengthwise of the said rotatable member, and control means connected to both said members and having a control element movable in a different plane to effect a reciprocation of the other member lengthwise of the rocking member, said control means being adjustable relative to said members.

13. In a tractor, a motor, a power transmission mechanism driven by the motor and having an element shiftable from neutral for forward or reverse running, a steering mechanism driven by the motor and having an element shiftable from neutral to effect a steering of the tractor in one direction or the other, means operable to shift the steering mechanism element and having a vertically rotatable member, means operable to shift the transmission mechanism element and having a member adjacent to and movable lengthwise of the said rotatable member, and control means connected to both said members and having a control element movable in one plane to effect a rocking of the rotatable member and movable in a different plane to effect a reciprocation of the other member lengthwise of the rocking member said control means being pivotally connected with each of said members.

14. In a tractor, a motor, a power transmission mechanism driven by the motor and having an element shiftable from neutral for forward or reverse running, a steering mechanism driven by the motor and having an element shiftable from neutral to effect a steering of the tractor in one direction or the other, means operable to shift the steering mechanism element and having a vertically rotatable member, means operable to shift the transmission mechanism element and having a member adjacent to and movable lengthwise of the said rotatable member, and control means connected to both said members and having a control element movable in one plane to effect a rocking of the rotatable member and movable in a different plane to effect a reciprocation of the other member lengthwise of the rocking member, said control means being pivotally connected with each of said members and longitudinally adjustable relative thereto.

15. A tractor having a motor, a forward and reverse driving power transmission mechanism driven by the motor, a steering mechanism driven by the motor, separate operating means for each of said mechanisms, and means connected to each of said operating means and having a differentially movable control member operable to impart predetermined control movements to either of said operating means.

16. A tractor having a motor, a forward and reverse driving power transmission mechanism driven by the motor, a steering mechanism driven by the motor, separate operating means for said mechanisms, one having a rocking member and the other a reciprocatory member movable lengthwise of the rocking member, and means connected to said members and having a unitary control element rockable in one plane to rock one member and rockable in a different plane to reciprocate the other member.

17. In combination, a tractor, a motor, a power transmission mechanism, a draft appliance pivotally trailing therefrom for relative horizontal turning movements and having a segmental rack concentric to the turning axis, a motor-driven steering mechanism carried by the tractor in inactive connection with said rack, separable connection between the motor and transmission mechanism, control means operable to render the steering mechanism active to turn the rack in either direction, said control means extending rearward over the draft appliance and having a vertically rotatable control portion, a second control means operable to break the connection between the motor and transmission mechanism and having a reciprocatory portion slidable longitudinally on the rotatable control portion of the first control means and a single member connected to both said control means and rockable in one plane to operate the first control means and at a different plane to operate the second control means.

18. A tractor having a draft appliance trailing therefrom for horizontal turning movements, a motor carried by the tractor, a steering mechanism operable by the motor to relatively turn the tractor and draft appliance, a control means operable to cause the steering mechanism to turn the tractor in one direction or the other relative to the draft appliance and having a vertically rotatable member mounted on the tractor lengthwise thereof, a second control means for the power transmission mechanism for shifting an element thereof to effect a forward or reverse driving of the tractor, said second means having a member mounted on and reciprocable longitudinally of the rotatable member of the first control means, and means connected to the rotatable and reciprocable members of the control means and rockable in one plane to reciprocate the other member.

19. In combination in a tractor, a steering mechanism operating member and a power transmission mechanism operating member both disposed longitudinally of the tractor and one mounted for rotary and the other for longitudinal reciprocatory movements, one on the other, and a unitary control for said members differentially movable to impart the respective operating movement to either.

20. In combination in a tractor, a steering mechanism operating member and a power transmission mechanism operating member disposed both longitudinally of the tractor and one mounted for rotary and the other for longitudinal reciprocatory movements, one on the other, and a control handle connected to each of said members and movable transversely of the rotary member to impart rotation thereto and longitudinally of said member to impart reciprocatory movements to the other member.

21. In combination in a tractor, a steering mechanism operating member and a power transmission operating member both disposed longitudinally of the tractor and one mounted for rotary and the other for longitudinal reciprocatory movements, one on the other, a control arm projecting transversely from the rotary member and rockable about the axis of said member to rotate the same and rockable longitudinally of the rotary member to impart reciprocatory movements to the other member.

22. In combination in a tractor, a steering mechanism operating member and two power transmission operating members all disposed longitudinally of the tractor, the former mounted for rotary and the other two for longitudinal reciprocatory movements, and a unitary control for said members differentially movable to impart the respective operating movements to said members.

23. In combination in a tractor, a steering mechanism operating member and two power transmission operating members all disposed longitudinally of the tractor, the former mounted for rotary and the other two for longitudinal reciprocatory movements, and handles carried by the rotary member and operable to rotate the same and each connected to a respective reciprocatory member and operable to reciprocate the same.

24. In combination in a tractor, a steering mechanism operating member and two power transmission operating members carried by the tractor, the former mounted for rotary movement and the other two for reciprocatory movements longitudinally of the axis of the rotary member, and a plurality of control handles projecting from the rotary member and each connected to a different one of the reciprocatory members and movable transversely of the rotary member to rotate such member and longitudinally of said member to reciprocate the other member to which attached.

25. In combination, a tractor having a steering mechanism and a power transmission mechanism, a draft appliance trailing from the tractor for horizontal pivotal movements relative thereto, a steering mechanism operating member and a power transmission mechanism operating member disposed longitudinally of the tractor and draft appliance and one mounted for rotary and the other for longitudinal reciprocatory movements, said members each having pivotal joints intersected by the turning axis of the draft appliance, and a unitary control for said members differentially movable to impart a respective operating movement to either.

26. In combination, a tractor having a steering mechanism, a power transmission clutch and a power transmission mechanism, a draft appliance trailing from the tractor for horizontal pivotal movements relative thereto, a steering mechanism operating member, a clutch operating member and a power transmission mechanism operating member disposed longitudinally of the tractor and draft appliance, the steering mechanism member being mounted for rotary movements and the other two members for longitudinal reciprocatory movements, said members each having pivotal joints in longitudinal register with the turning axis of the draft appliance, and a unitary control for said members operable to impart respective operative movements thereto.

In testimony whereof I have hereunto signed my name to this specification.

FRANK H. GERDEMAN.